(12) United States Patent
MacKarvich

(10) Patent No.: US 6,494,478 B1
(45) Date of Patent: Dec. 17, 2002

(54) FORCE RESPONSIVE TRAILER HITCH

(76) Inventor: Charles J. MacKarvich, 3940 Paces Manor Dr., Atlanta, GA (US) 30339

( * ) Notice: Subject to any disclaimer, the term of this patent is extended or adjusted under 35 U.S.C. 154(b) by 0 days.

(21) Appl. No.: 09/665,017

(22) Filed: Sep. 19, 2000

(51) Int. Cl.⁷ .............................. B60D 1/06; G01G 19/00
(52) U.S. Cl. ..................... 280/489; 280/483; 280/511; 177/136
(58) Field of Search ................................. 280/483, 489, 280/486, 485, 511, 491.5, 491.2; 267/138, 136; 224/519; 177/136

(56) References Cited

U.S. PATENT DOCUMENTS

| | | | |
|---|---|---|---|
| 2,513,932 A | | 7/1950 | Grube ........................ 280/33.9 |
| 2,635,892 A | | 4/1953 | Shutter ...................... 280/33.44 |
| 3,436,069 A | * | 4/1969 | Henschen ................... 267/57.1 |
| 3,700,053 A | * | 10/1972 | Glissendorf ................. 177/136 |
| 4,050,714 A | * | 9/1977 | Epp ............................ 280/495 |
| 4,147,376 A | * | 4/1979 | Slazas ........................ 280/489 |
| 4,351,542 A | * | 9/1982 | Lovell et al. ............... 280/483 |
| 4,773,668 A | * | 9/1988 | Muonro ...................... 280/485 |
| 4,792,154 A | * | 12/1988 | Kerst et al. ................. 280/489 |
| 5,823,560 A | | 10/1998 | Van Vleet .................... 280/484 |
| 5,868,415 A | | 2/1999 | Van Vleet .................... 280/483 |
| 6,149,169 A | * | 11/2000 | Chelgren ..................... 280/86.1 |

* cited by examiner

*Primary Examiner*—Anne Marie Boehler
*Assistant Examiner*—Tony Winner
(74) *Attorney, Agent, or Firm*—Thomas, Kayden, Horstemeyer & Risley

(57) ABSTRACT

A trailer hitch apparatus (10) for dampening shocks and surges between a towing vehicle (2) and a trailer (1) is disclosed. The hitch apparatus (10) includes a draw bar (20) for removably coupling to a towing vehicle (2), a hitch ball assembly (16) for coupling to a tongue of a trailer, and a torsional spring apparatus (30) pivotally coupling the draw bar to the hitch ball assembly. The torsional spring apparatus is adapted to resist the pivoting motion of the hitch ball assembly with respect to the draw bar thereby dampening shocks and surges transmitted between the towing vehicle and the trailer. The torsional spring further includes an incremental scale (13) and indicator (12) working in conjunction with the torsional spring apparatus for weighing the tongue weight of a trailer.

38 Claims, 3 Drawing Sheets

FORCE RESPONSIVE TRAILER HITCH

FIELD OF THE INVENTION

This invention relates generally to hitches for making draft connections between vehicles, for example, between trailers and towing vehicles, and more specifically, to force responsive hitches.

BACKGROUND OF THE INVENTION

Conventional trailer hitches generally include a support structure rigidly attached to the rear of a towing vehicle. A hitch ball connector is mounted to the rigid support structure and is engaged by a compatibly shaped receptacle or coupling mounted on the forward end of a tongue of the trailer frame. This creates a pivotal connection in a plane normal to the length of the towing vehicle but the connection is rigid along the lengths of the vehicles. Because of the longitudinal rigidity, longitudinal surges, both compressive and expansive, and vertical shocks, both up and down, are transmitted between the trailer and the towing vehicle.

Longitudinal surges and vertical shocks between the towing vehicle and the trailer have numerous sources. For example, upon acceleration or deceleration of the towing vehicle, expansive or compressive surges, respectively are longitudinally transmitted between the trailer and the towing vehicle. A driver commonly causes these surges when accelerating and decelerating the towing vehicle. Further, bumps, ruts, potholes, etc. in a road surface subject the towing vehicle and a trailer to vertical vibrations and other vertical shocks. These vertical shock forces are transferred between the towing vehicle and trailer through the trailer hitch. It is well known that undue wear and damage to the towing vehicle, the hitch, and the trailer result from continual surges and shocks commonly associated with towing a trailer. Thus, it is desirable to reduce effects on both the towing vehicle and trailer of the surges and shocks.

In addition to causing undue wear and damage to both the trailer hitch and the trailer, surges and shocks between the towing vehicle and its trailer can be detrimental to the cargo being hauled in the trailer. For example, live stock such as horses are prone to becoming unnerved when confined within a trailer and the surges and shocks can cause them to become even further unnerved and scared. A racehorse, for example, can become too "stressed-out" from having been transported in a trailer to perform at peak efficiency, and consequently, the horse's owner may suffer financially. Thus, it is desirable to reduce the surges and shocks transmitted to the trailer for the comfort of the livestock and for the protection of other cargo that may be harmed by surges and shocks.

Trailer hitches are designed to accommodate various tongue weights of a trailer. Ideally, the tongue-weight is five to ten percent of the gross trailer weight. An excessive tongue weight, a tongue weight greater than the rated capacity of the trailer hitch, leads to undue wear and damage to the trailer hitch and to the towing vehicle, and is also a safety hazard. An excessive load placed on the trailer hitch results in the rear end of the towing vehicle being pushed downward, and the front end of the towing vehicle becoming raised. The raised front end reduces the contact load between the steering wheels of the towing vehicle and the road or ground, thereby creating a safety hazard for the operators of the towing vehicle and all other drivers sharing the road with the towing vehicle. Conversely, trailer tongues having a tongue weight of less than five percent of the trailer's gross weight are prone to accidentally becoming decoupled from the trailer hitch; a bump in the road can result in an upward vertical shock greater than the load exerted by the tongue on the hitch ball. The net upward vertical force might result in the decoupling of the trailer from the trailer hitch. Thus, for safety reasons it is important to apply the correct tongue weight to the trailer hitch.

Therefore, there exists a need for a trailer hitch assembly that has the ability to dampen surges and shocks between the towing vehicle and trailer in both the longitudinal and vertical directions simultaneously. Furthermore, there exists a need for a hitch assembly that can measure the tongue weight of the trailer to make sure that the proper weight limit applied by the tongue of the trailer to the hitch ball is not exceeded.

SUMMARY OF THE INVENTION

Briefly described, the invention is directed to a hitching mechanism that dampens both surges and shocks experienced between a towing vehicle and its' trailer. Vertical and longitudinal forces applied to the hitching mechanism are dampened by a torsional spring included in the hitching mechanism.

In one embodiment of the invention, a hitch assembly for coupling to a tongue of a trailer includes a draw bar having first and second opposed ends, a yieldable retaining means, and a means for mounting a tongue of a trailer. The first end of the draw bar is removably coupled to a receiver tube rigidly mounted to a towing vehicle. The trailer mounting means is pivotally supported at a pivot point on the draw bar and extends from the pivot point to a distal end having a means for receiving a hitch ball. The hitch ball receiving means is horizontally and vertically offset from the pivot point of the draw bar such that the mounting means moves in an arc about the pivot point in response to shocks and surges, i.e. horizontal and vertical forces, experienced between the towing vehicle and the trailer tongue. In response to the mounting means pivoting in an arc about the pivot point the yieldable retaining means provides a retaining force to resist the pivoting and to biases the mounting means to a predetermined position.

In another embodiment, the invention includes a conventional rectangular draw bar, a torsional spring assembly mounted to the draw bar at the pivot point, and a hitch ball assembly mounted to the torsional spring so that the draw bar is biased by the torsion spring about the pivot point toward a predetermined position. The hitch ball assembly includes a pair of opposed side load support arms, a spindle and a spacer-bar assembly that extend between the side arms. The draw bar is received by a receiver tube mounted rigidly to the towing vehicle, and is removably coupled thereto. The draw bar has a top wall with a housing of a torsional spring apparatus rigidly affixed thereto. Thus, when the draw bar is coupled to the receiver tube, the towing vehicle, the receiver tube, the draw bar and the torsional spring housing define a rigid structure that moves as one piece.

In accordance with one embodiment, the torsional spring apparatus includes a torsional housing which is transversely mounted to the top wall of the draw bar and has a generally square hollow elongated interior that extends normal to the length of the draw bar. A plurality of rubber cords are positioned at the corners of the square interior. A square spindle having opposed ends extends though the torsional housing. The square spindle is generally co-axially aligned with the center-line of the interior of the housing and held therein by the plurality of rubber cords. The plurality of rubber cords simultaneously abut the sides of the square spindle and the interior corners of the housing. The rubber cords essentially surround the square spindle urging the spindle toward a predetermined position.

In accordance with a preferred embodiment, a pair of generally reclined, or open, L-shaped, load bearing side arms are removably attached at one end thereof to the opposed ends of the square spindle. A spacer-bar assembly configured to receive a hitch ball is mounted between the load bearing support arms. The hitch ball assembly includes a spacer-bar, the load bearing side arms, and the spindle, and these elements pivot as one element about the center-line of the torsional housing. The hitch ball assembly is configured to receive the hitch ball such that the hitch ball is horizontally and vertically offset from the center-line of the torsional housing. Thus, the hitch ball assembly pivots in an arc about the center-line of the torsional housing in response to shocks and surges transmitted between the towing vehicle and the trailer. With this arrangement, forces transmitted between the towing vehicle and the trailer are dampened by the rubber cords as the cords resist the pivoting motion of the spindle.

In accordance with one embodiment of the invention, the torsional spring apparatus working in conjunction with the side arms form a spring scale for weighing the tongue weight of a trailer. On the top wall of the housing is a plurality of essentially parallel lines forming an incremental scale for indicating the load being applied to the spacer-bar assembly by a tongue of a trailer. The upper portion of one of the side arms has a notch cut out of it with a groove formed therein. When a load is applied to the spacer-bar assembly, the pair of side arms and the spindle pivot as one structure in response to the load. The pivoting of the spindle compresses the rubber cords between the spindle and the interior sidewalls of the housing and the compression of the rubber cords counters the torque applied to the spindle by the load. Thus, the displacement of the groove due to the pivoting of the side arms corresponds to the load being applied to the spacer-bar assembly, and the load is determined from the alignment of the groove with the incremental scale.

Thus, it is an object of the present invention to provide an improved trailer hitch whereby fore or aft surges and vertical shocks between the towing vehicle and its trailer are simultaneously absorbed or reduced.

Another object is to provide for an improved trailer hitch capable of simultaneously absorbing vertical shocks and fore or aft surges which is of simplistic design with a minimum number of components allowing for a lower manufacturing cost.

Still another object of the invention is to provide an improved trailer hitch with a load gauge capable of displaying the vertical load on the hitch.

Other objects, features and advantages of the present invention will become apparent upon reading the following specification which taken in conjunction with the accompanying drawings.

BRIEF DESCRIPTION OF THE DRAWINGS

The invention can be better understood with reference to the following drawings. The components in the drawings are not necessarily to scale, emphasis instead being placed upon clearly illustrating the principals of the present invention. Like reference numerals designate corresponding parts throughout the several views.

DETAILED DESCRIPTION OF THE INVENTION

Figure 1:
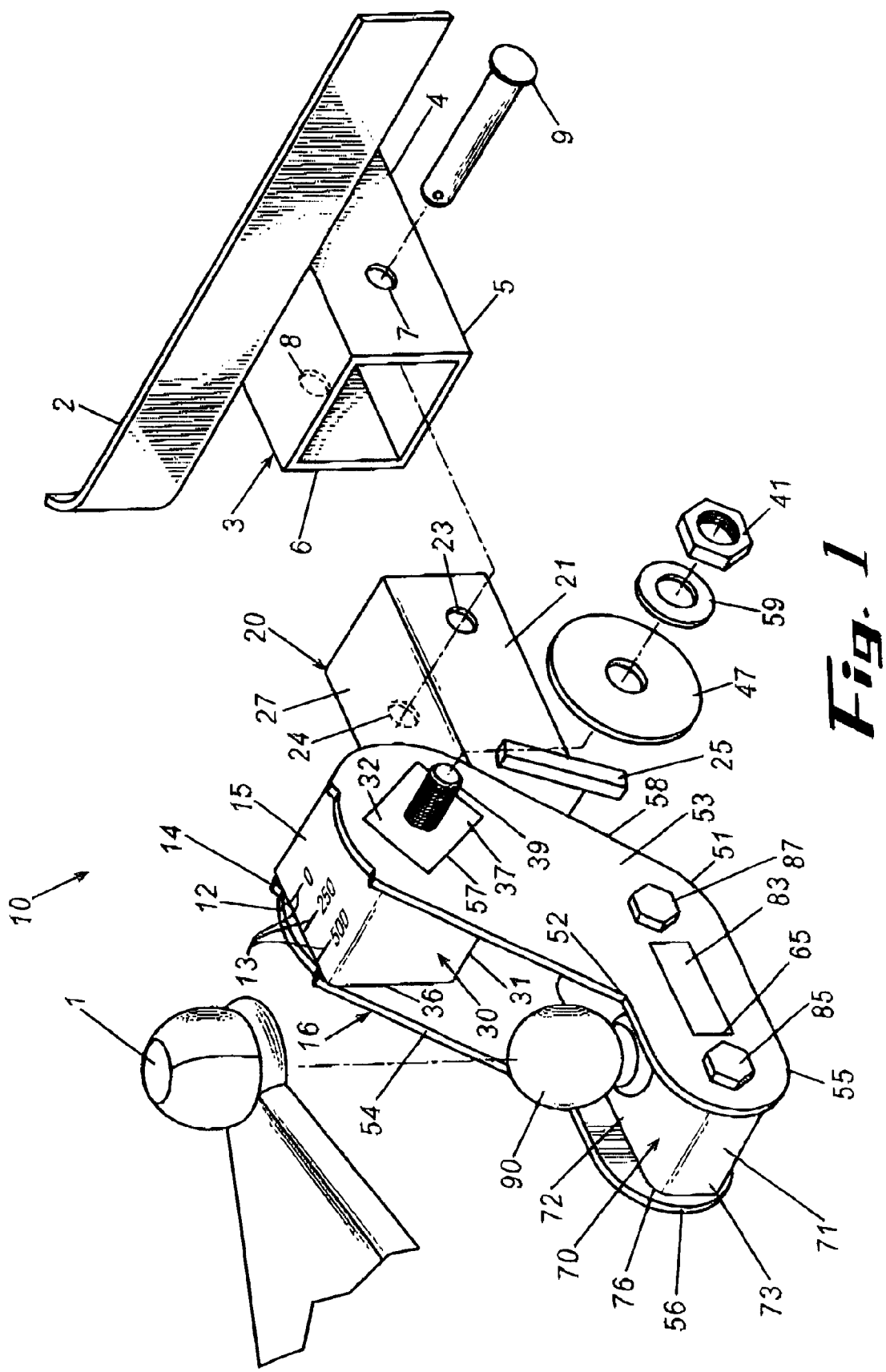
FIG. 1 is a partially exploded perspective view of the force responsive trailer hitch assembly.

FIG. 1 illustrates a towing vehicle 2 having a tow mount 3 rigidly affixed thereto. The tow mount 3 may be mounted on the towing vehicle 2 in any number of ways depending upon the configuration of the towing vehicle. Those skilled in the art would know the means for safely and securely attaching the tow mount to the towing vehicle such as bolting it to the frame of the towing vehicle or welding it to the frame.

Tow mount 3 and structural components of trailer hitch assembly 10 are generally formed from heavy gauge steel, or other materials, or metals known to those skilled in the art, of sufficient strength for towing a trailer.

Trailer hitch assembly 10 includes draw bar 20, torsional spring housing 31, and hitch ball assembly 16 pivotally supported by draw bar 20. The hitch ball assembly pivots in an arc, shown as dashed line 100 in FIG. 1, in response to shocks and surges between the trailer tongue and the towing vehicle. Yieldable retaining means resist the pivoting motion of the hitch ball assembly and biases the hitch ball assembly to a predetermined position. Yieldable retaining means include materials such as rubber cords, springs, other elastic deformable materials, or the like. Hitch ball assembly 16 includes a spacer-bar assembly 70 adapted to receive a hitch ball, a pair of opposed side arms 51 and 52, and a spindle 32 which are rigidly coupled together to pivot as one structural element and will be described in hereinbelow.

Tow mount 3 includes receiver tube 4 having a generally square exterior with opposed sidewalls 5 and 6 and having a generally hollow square interior configured to closely and slidably receive the draw bar 20. The receiver tube is arranged with the longitudinal centerline of the tubular shape extending parallel to the longitudinal centerline of the towing vehicle. Opposed side walls 5 and 6 have a pair of circular aligned bores 7 and 8 formed therethrough, respectively. It should be understood that while the draw bar and the receiver tube are shown to be generally square, they can have many cross-sectional profiles including rectangular, round, triangular, octangle, and the like.

Figure 3:
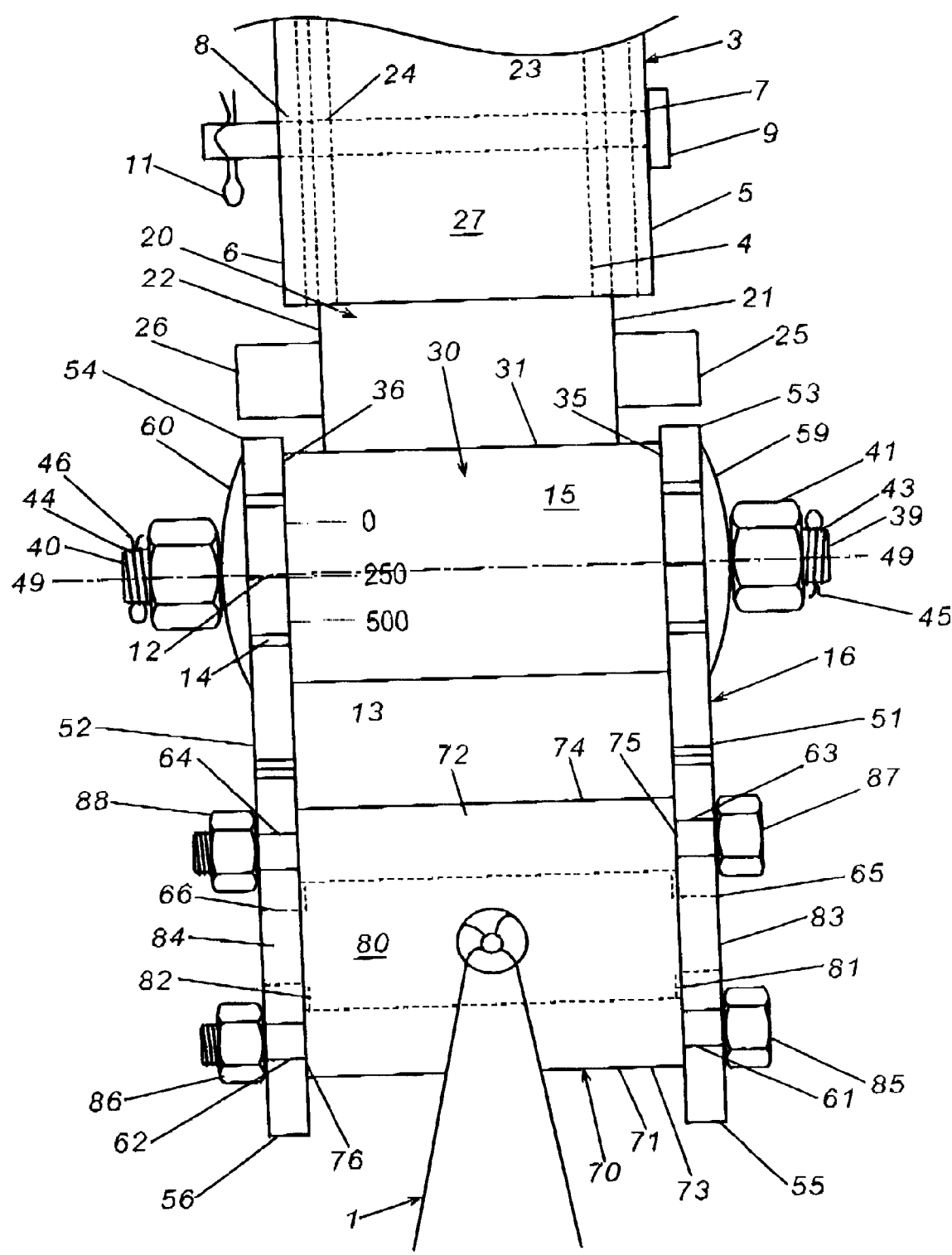
FIG. 3 is a top view of the hitch assembly.

Referring to FIGS. 1 and 3, the draw bar 20 includes a pair of opposed sidewalls 21 and 22 having a pair of aligned circular bores 23 and 24 formed therethrough, respectively. Thus, once the draw bar is inserted into the receiver tube so that bores 23 and 24 are aligned with bores 7 and 8, pin 9 is inserted through the bores to retain the draw bar within the receiver tube. Pin 9 is a conventional hitch pin configured to receive a hairpin 11 to hold it in place. Alternatively, hitch pin 9 could be replaced by a standard nut and bolt.

The draw bar 20 further includes a pair of aligned travel stops 25 and 26 rigidly affixed by means such as welding to opposed sidewalls 21 and 22, respectively, and a generally flat top wall 27. Rigidly affixed to the top wall of the draw bar by means such as welding is the torsional spring housing 31. Thus, the torsional spring housing 31 and the draw bar 20 form a first rigid structure which moves essentially as one rigid piece without dampening or absorbing shocks and/or surges.

Figure 2:
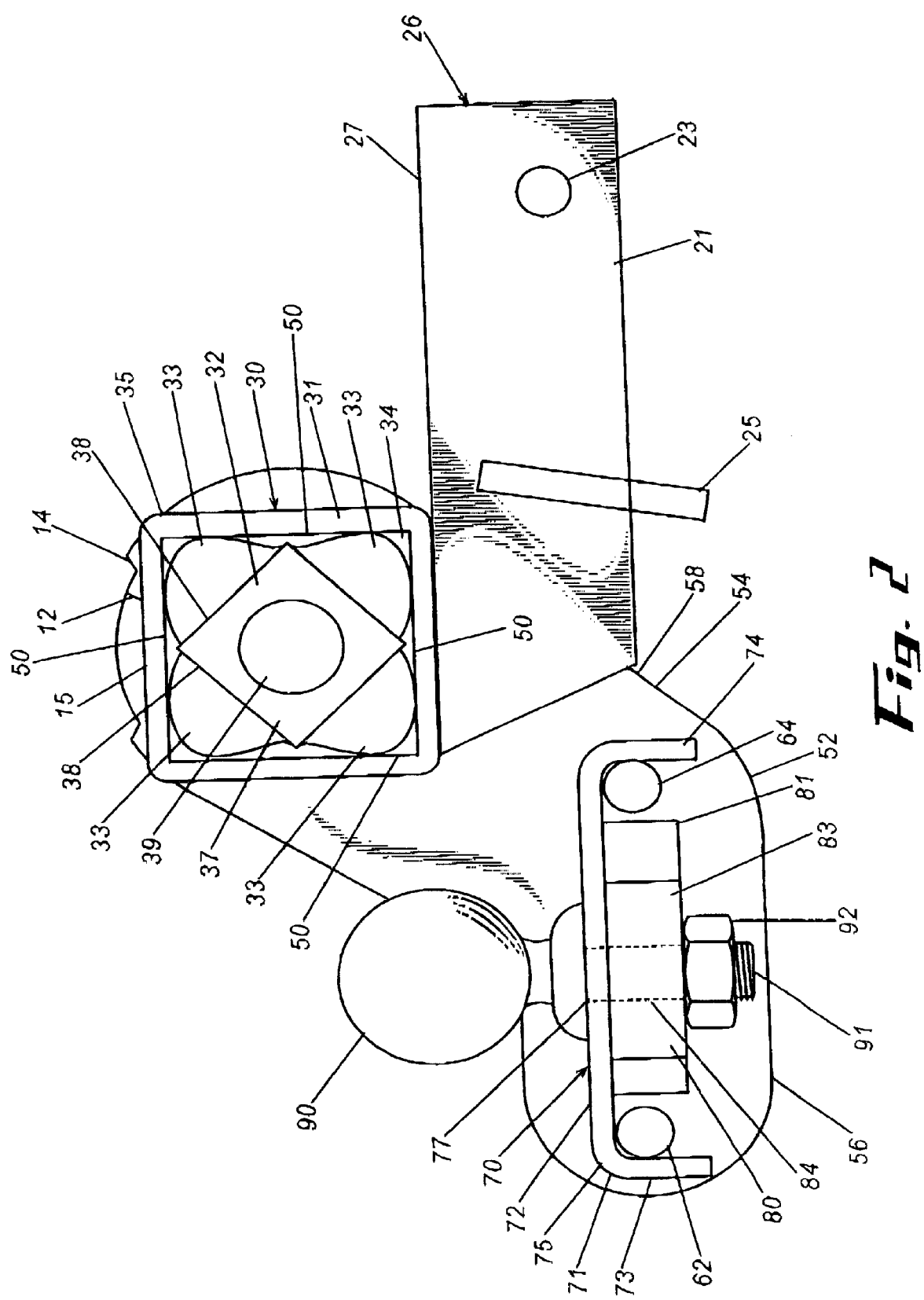
FIG. 2 is a side view of the hitch assembly with side arm 51 not shown.

Referring to FIG. 2 that illustrates hitch assembly 10 with side arm 51 removed and to FIG. 3, the torsional spring assembly 30 includes the torsional spring housing 31 and a plurality of rubber cords 33. The torsional spring housing 31 having opposed ends 35 and 36 which define a transverse length and having a generally square hollow interior 34 is transversely mounted to the draw bar such that the opposed ends 35 and 36 overhang sidewalls 21 and 22 of the draw bar, respectively.

The square hollow interior 34 is essentially filled by the spindle 32 extending therethrough and a plurality of cords 33. Spindle 32 is a square spindle having opposed square ends 37 defining a spindle length greater than the transverse length of the torsional spring housing. Extending from the opposed square ends 37 of the spindle are round threaded ends 39 and 40, co-axially aligned with the center of the spindle. Round threaded ends 39 and 40 are configured to receive nuts 41 and 42 and have transverse pinholes 43 and 44 formed therethrough at their respective distal ends for receiving cotter pins 45 and 46, respectively.

The spindle 32 is configured to be rotatable within the torsional spring housing 31. In operable non-loaded position the spindle is rotated relative to the torsional spring housing such that the angle between each of the interior walls 50 of the torsional spring housing 31 and each of the sidewalls 38 of the spindle 32 is approximately 45°. Thus, the side walls 38 of the spindle and the interior walls 50 of the torsional spring housing define four triangular regions having rubber cords 33 inserted therein. Each rubber cord 33 is configured to essentially fill a triangular region such that it abuts a sidewall of the spindle and two interior walls of the housing simultaneously. Any movement, either translational or rotational, of the spindle elastically deforms the plurality of rubber cords, compressing them against the interior walls of the torsional spring housing. Thus, the spindle is not held rigidly in place, rather, it is held elastically in place by the plurality of rubber cords and biased toward a predetermined position and alignment. Generally, the spindle is urged by the plurality of rubber cords toward a position that is co-axially aligned with the center axis 49, shown as a dashed line in FIG. 3, of the torsional spring housing and rotated approximately 45° with respect to the interior walls of the torsional spring housing. It should be understood that while interior of the torsional spring housing and the spindle have been illustrated as square they can have other non-circular cross-sectional profiles including rectangular, triangular and the like.

Referring to FIG. 1, side arms 51 and 52 are reclined or open L-shaped having upper portion 53 and 54 and base portion 55 and 56, respectively. The upper portion 53 has a square aperture 57, formed therethrough for receiving the square end 37 of the spindle 32. Aperture 57 is configured to fit closely around the square end 37. The upper portion 54 has a corresponding aligned square aperture (not shown) for receiving the corresponding opposed square end (not shown) of the spindle 32, and the square aperture is similarly configured to fit closely around the corresponding square end. Thus, with the opposed square ends of the spindle 32 received by the square apertures in the open L-shaped side arms, the spindle 32 cannot pivot with respect to the side arms 51 and 52. Rather, when the side arms 51 and 52 are mounted to the spindle 32, the spindle 32 and the side arms 51 and 52 pivot together. The square aperture 57 of side arm 51 has a center that defines a pivot point 48 about which the side arm 51 pivots when coupled to spindle 32. Similarly, in side arm 52 the square aperture (not shown) has a center that defines the pivot point of side arm 52 when the side arm is coupled to spindle 32. The pivot point 48 of side arm 51 and the pivot point (not shown) of side arm 52 are aligned with the centerline axis 49.

Still referring to FIG. 1, square aperture 57 of the side arm 51 receives the square end 37 of the spindle. The side arm 51 is rigidly coupled to the spindle by a generally flat washer 47, a generally conical washer 59, nut 41, and a cotter pin (not shown). Flat washer 47 is received on round threaded end 39 of the spindle and abuts the square end 37. The conical washer 59 is received on the round threaded end 39 and engages the upper portion 53 of the side arm. The nut 41 having internal threads is adapted to be received on the round thread end 39 and tightened thereon. As the nut 41 is tightened onto the spindle, the nut engages the conical washer compressing it against the flat washer and the upper portion 53 of the side arm 51. The flat washer is adapted to engage the conical washer and prevent the conical washer from being compressed beyond a given point, so that the side arm 51 is not pressed against the end 35 of torsional spring housing 31 by the conical washer 59.

Referring now to FIG. 3, arm 52 is to coupled to the spindle in an identical fashion. A flat washer (not shown) abuts the spindle and a conical washer 60. The conical washer 60 is compressed by the nut 42 against the flat washer (not shown) and the upper portion 54 of the side arm 52.

Still referring to FIG. 3, the compression forces between the nuts 41 and 42 and the conical washers 59 and 60 prevent the nuts from becoming loosened by vibrations, shocks, and/or surges. Additionally, cotter pins 45 and 46 are received by transverse pin holes 43 and 44 proximal to the opposed ends 39 and 40, respectively, to prevent the nuts from inadvertently coming off of the spindle.

It should be understood that while the aperture 57 and the square end 37 have been illustrated as square, they can have many other shapes including rectangular, triangular, elliptical, and the like, so long as the side arms pivot rigidly with the spindle.

Referring now to FIGS. 1 through 3, the base portions 55 and 56 are generally horizontal extending obliquely from the upper portion 53 and 54, respectively. The base portion 55 has generally horizontally aligned bolt holes 61 and 63 formed therethrough. Disposed between the bolt holes is a rectangular aperture 65 formed therethrough for receiving a tongue of a spacer-bar. The base portion 56 which is essentially identical to the base portion 55 has generally horizontally aligned bolt holes 62 and 64 which are also transversely aligned with the bolt holes 61 and 62, respectively. Disposed between the bolt hole 62 and 64 and transversely aligned with the aperture 65 is a rectangular aperture 66 for receiving a tongue of a spacer-bar.

Disposed between the base portions 55 and 56 is spacer-bar assembly 70 and a hitch ball 90 for receiving and pivotally coupling a trailer tongue 1 thereto. spacer-bar assembly 70 includes a cover-plate 71 and a spacer-bar 80. The spacer-bar having opposed ends 81 and 82 with tongues 83 and 84 extending therefrom, respectively, extends between the base portions 55 and 56 with the tongues 83 and 84 received by the rectangular apertures 65 and 66, respectively.

The cover-plate 71 having a generally flat topwall 72 and opposed sides 73 and 74 extending generally theredown is formed in an inverted U-shape such that the aligned bolt holes 61 and 62 and the aligned bolt holes 63 and 64 are simultaneously disposed between the opposed sides 73 and 74. The cover-plate having opposed ends 75 and 76 extends traversely between the base portions 55 and 56 and is disposed on the spacer-bar. Thus, the opposed ends 75 and 76 of the cover-plate 71 and the opposed ends 81 and 82 of the spacer-bar simultaneously abut the base portions 55 and 56 respectively.

A pair of threaded bolts 85 and 87 extend through the aligned bolt holes 61 and 62 and the aligned bolt holes 63 and 64, respectively, and have a pair of nuts 86 and 88 tightened thereon, respectively. Thus, the spacer-bar 80 and the cover-plate 71 maintain a pre-determined separation of the side arms as nuts 86 and 88 are tightened on bolts 85 and 87, respectively. Thus, the cover-plate is held in position by compressing the side arms against the opposed ends 75 and 76. The spacer-bar is held in position by having the tongues 83 and 84 received by the rectangular apertures 65 and 66, respectively, and by compressing the side arms 51 and 52 against opposed ends 81 and 82. In the preferred embodiment, the side arms are generally parallel, and the distance between the side arms is greater than the transverse length of the torsional spring housing 31. Thus, the upper portions 53 and 54 of the side arms are proximal to opposed ends 35 and 36 of torsional spring housing 31 but are separated therefrom. The side arms are strong enough that when the conical washers are compressed by the nuts the side arms do not flex inward and engage the opposed ends of housing 31. Therefore, the side arms having the spindle 32 rigidly coupled therebetween are adapted to be pivotable around the torsional spring housing because the side arms do not bind on the opposed ends of the torsional spring housing.

The cover-plate 71 and the spacer-bar 80 have aligned bores 77 and 89 formed therethrough for receiving a shaft of a hitch ball. A conventional hitch ball 90 having a threaded shaft 91 extends through bores 77 and 89 and is secured to the spacer-bar assembly 70 by a nut 92.

Any vibration, shock and/or surge transmitted by the tongue 1 to the hitch ball 90 is transmitted to the spindle 32 by the side arms 51 and 52 without any dampening. However, the spindle is urged in place by the plurality of rubber cords which elastically deform to resist any motion of the spindle. Thus, shocks and/or surges, i.e. forces, are transmitted between the trailer tongue 1 and the towing vehicle 2 through the plurality of rubber cords, thereby dampening the transmitted forces. For example, when the towing vehicle decelerates the trailer has a tendency to overrun the towing vehicle. The reclined L-shaped side arms transmit the horizontal force to the spindle as a torque, thereby producing a rotation of spindle. The rotation of the spindle is elastically resisted by the plurality of rubber cords as the cords are compressed between the interior sidewalls of the torsional spring housing and the sidewalls of the spindle. Thus, the force is absorbed by the compression of the plurality of rubber cords.

When the operator of the towing vehicle performs an emergency stop or slams on the brakes of the towing vehicle a large horizontal force is applied to the hitch ball 90 by trailer tongue 1. The horizontal force is transmitted from the hitch ball to the hitch ball assembly 16, thereby causing the hitch ball assembly to pivot toward the towing vehicle. To prevent the hitch ball assembly from pivoting to far toward the towing vehicle the pair of overtravel stops 25 and 26 are configured to engage the hitch ball assembly at a predetermined point and stop it from pivoting beyond that point. The overtravel stop 25 engages the rear edge 58 of the side arm 51, similarly, the overtravel stop 26 engages the rear edge of side arm 52. Thus, the rubber cords provide a force for resisting the pivoting of the hitch ball assembly and urging it toward its predetermined, and the overtravel stops prevent the hitch ball assembly from pivoting towards the towing vehicle beyond a given point. The amount of pivoting of the hitch ball assembly is determined by the location of the overtravel stops; the closer the overtravel stops are to the rear edges of side arms the less the side arms can pivot before being stopped by the overtravel stops. Preferably, the overtravel stops are configured to engage the rear edges when a large torque is applied to the spindle.

In the preferred embodiment, hitch assembly 10 includes a means for measuring the tongue weight of trailer tongue 1, such as an indicator 12 and an incremental scale 13. The indicator 12 can be formed in either of the side arms. In an embodiment, the upper portion 54 of the side arm 52 has a notch 14 with the indicator groove 12 formed therein. The incremental scale 13 is marked on the topwall 15 of torsional spring housing 31. The incremental scale may be permanently marked on the torsional spring housing by means such as stamping, or may be marked by means such as decals or painting. Ideally, the incremental scale extends from zero (0) to a value corresponding to the maximum tongue weight capacity of hitch assembly 10. When there is no load placed on the hitch ball the indicator groove is aligned with the 0 mark of the incremental scale, as indicated in FIG. 1. When a load is placed on the hitch ball the side arms and the spindle pivot as one in response to the load, thereby causing the indicator groove to move relative to the incremental scale. The compression of the rubber cords by the pivoting of the spindle produces a counter force that balances the load applied to the hitch ball. Referring to FIG. 3, the load being applied to hitch assembly 10 by trailer tongue 1 is 250 pounds, as indicated by the alignment of the indicator groove 12 with the incremental scale 13.

While the incremental scale 13 indicates a maximum tongue weight of 500 pounds, trailer hitch assembly 10 can be manufactured to other maximum tongue weights by using rubber cords having different elasticity, changing the size and shape of the spindle, and/or changing the length and/or shape of the side arms. Furthermore, the incremental scale and the indicator could be in operational relationship such that the incremental scale is marked on a pivotable element, with respect to draw bar, and the indicator is marked on a non-pivotable element. For example, the incremental scale could be marked in the notch 14 of a sidearm, and the indicator groove could be marked on the topwall of the torsional spring housing 31. Thus, as the side arms pivot in response to a load being placed on the hitch ball, the incremental scale pivots with respect to the indicator groove, thereby indicating a tongue weight.

While hitch assembly 10 has been illustrated with the hitch ball 90 and the draw bar 20 being approximately horizontally aligned, as shown in FIG. 2, it should be understood that the hitch ball can be vertically displaced from the draw bar. Frequently, the towing vehicle 2 and the trailer tongue 1 are vertically offset so that when the hitch ball is approximately the same height as the receiver tube it is too high for the trailer to be coupled thereto. Thus, in order to lower the hitch ball to an appropriate level for the trailer tongue the side arms of the hitch assembly are adapted to extend further down from the spindle, thereby lowering the hitch ball with respect to draw bar. Similarly, the angle at which the upper portions of the side arms are reclined can be changed to further adjust the height of hitch ball with respect to draw bar. Changing the size and/or shape of the side arms generally results in a change in the torque being applied to the spindle for a given load, thereby changing the dynamics of the torsional spring. However, the dynamics of the torsional spring can be adjusted to fit any dynamical characteristics desired by the manufacturer by adjusting such parameters such as the size and shape of the side arms, the elasticity of the cords, and the size and shape of the spindle. Thus, the hitch assembly 10 can be easily configured as a drop down hitch assembly. In a similar manner, hitch assembly 10 can be configured as a raised hitch assembly by having the side arms extending from the spindle generally upward and out.

Although a preferred embodiment of the invention has been disclosed in detail herein, it will be obvious to those skilled in the art that variations and modifications of the disclosed embodiment can be made without departing from the spirit and scope of the invention as set forth in the following claims.

I claim:

1. A trailer hitch apparatus for coupling a tongue of a trailer to a towing vehicle, the apparatus comprising:
    a draw bar configured for rigid mounting to a towing vehicle;
    at least one load bearing arm having first and second ends,
    a pivotal mounting means pivotally mounting said first end of said load bearing arm to said draw bar at a pivot point;
    a hitch ball mounted to said second end of said load bearing arm;
    yieldable retaining means in contact with said pivotal mounting means, said yieldable retaining means engaging said pivotal mounting means and biasing with a retaining force said second end of said load bearing arm and said hitch ball about said pivot point to a predetermined position horizontally and vertically offset from said pivot point;
    whereby the second end of the at least one load bearing arm is urged against the retaining force of the yieldable retaining means in an arc about the pivot point in response to shocks and surges between the towing vehicle and the trailer.

2. The apparatus of claim 1, wherein the at least one arm includes a pair of parallel arms each pivotally attached to said draw bar.

3. The apparatus of claim 2, wherein the pivotal mounting means includes a housing defining a non-cylindrical elongated interior surface and a spindle having opposed ends and a non-cylindrical exterior surface extending therebetween, at least one of said opposed ends having said first end of said at least one load bearing arm removably coupled thereto, and said yieldable retaining means includes at least one rubber cord positioned between said spindle exterior surface and said housing interior surface.

4. The apparatus of claim 1, wherein the at least one arm further includes a first arm and a second arm generally aligned with said first arm, each of said arms having a first end and a second end, and each first end having a pivot point; and
    wherein said hitch ball includes a rigid spacer-bar assembly extending between said second ends of said first and second arms.

5. The apparatus of claim 4 further including a non-cylindrical spindle having a plurality of side-walls extending between said first ends of said first and second arms, said spindle rigidly coupled to each of said load bearing arms and aligned with said pivot point, whereby said spindle, said first and second arms and said spacer-bar assembly pivot as one assembly about said pivot point.

6. The apparatus of claim 5 further including a generally hollow housing having a plurality of interior walls transversely aligned with said second end of said draw bar for housing said yieldable retaining means, wherein said spindle extends through said housing engaging said yieldable retaining means.

7. The apparatus of claim 6, wherein said yieldable retaining means engages at least one side-wall of said spindle and at least one interior wall of said housing, whereby said yieldable retaining means urges said spindle toward a predetermined position.

8. The apparatus of claim 7 wherein said yieldable retaining means includes at least one rubber cord.

9. The apparatus of claim 1, wherein the draw bar includes at least one side wall and a top wall, and further including:
    at least one stopping means rigidly affixed to said at least one side wall, wherein said stopping means engages said at least one load bearing arm proximal to said first end thereby preventing said at least one side arm from pivoting beyond a predetermined position.

10. A trailer hitch apparatus comprising:
    a draw bar having opposed first and second ends, said first end adapted to be received by a receiver tube for rigidly and removably coupling to a towing vehicle;
    a hitch ball assembly including a hitch ball;
    a pivotal connection for pivotally connecting together said draw bar and said hitch ball assembly with said hitch ball movable in an arc about said pivotal connection;
    biasing means disposed generally around said pivotal connecting means, said biasing means engaged between said draw bar and said hitch ball assembly for urging said hitch ball to a position displaced vertically and horizontally from said pivotal connection so that said hitch ball can pivot against the force applied by said biasing means about said pivotal connection;
    whereby said trailer hitch apparatus dampens shocks and surges transmitted between said draw bar and said hitch ball assembly.

11. The hitch apparatus of claim 10, further including stop means mounted to said draw bar for stopping the movement of said hitch ball assembly beyond a predetermined position with respect to said draw bar.

12. The hitch apparatus of claim 10, wherein said biasing means includes at least one rubber cord, whereby pivoting said hitch ball assembly relative to said draw bar causes said at least one rubber cord to be compressed, thereby dampening shocks and surges transmitted between said hitch ball assembly and said draw bar.

13. The hitch assembly apparatus of claim 10 further including weighing means for indicating the weight of a tongue of a trailer hitch mounted to said hitch ball assembly.

14. The hitch assembly of claim 13, wherein said tongue weighing means further includes an incremental scale and an indicator, said hitch ball assembly having said indicator marked thereon, said incremental scale having a plurality of increments stationary relative to said draw bar and being in operational relationship with said indicator, whereby said indicator pivots with said hitch ball assembly in response to a load being applied to said hitch ball assembly.

15. A trailer hitch assembly comprising:
    a rigid draw bar having opposed first and second ends, said first end adapted to be received by a receiver tube for removably coupling to a towing vehicle;
    a hitch ball assembly vertically and horizontally offset from said rigid draw bar;
    a torsional spring assembly configured for weighing a tongue of a trailer hitched to said hitch ball assembly, said torsional spring assembly including a pivotal connector connecting said rigid draw bar to said hitch ball assembly, whereby said hitch ball assembly pivots relative to said rigid draw bar in response to a trailer's tongue being hitched to said hitch ball assembly.

16. The hitch assembly of claim 15, wherein said weighing means further includes an incremental scale having a plurality of increments and an indicator, said incremental scale and said indicator being in operational relationship whereby said indicator pivots relative to said indicator scale as said hitch ball assembly pivots relative to said draw bar.

17. The hitch assembly of claim 15, wherein said weighing means dampens shocks and surges between said hitch ball assembly and said draw bar.

18. A trailer hitch apparatus for coupling a trailer to a towing vehicle, the apparatus adapted to be received by a vehicle mounted receiver tube, said apparatus comprising:
   a draw bar having a top wall, and first and second opposed ends, said first end adapted to be removably coupled to a receiver tube;
   a torsional spring apparatus rigidly affixed to said top wall proximal to said second end of said draw bar;
   a hitch ball assembly supported by said torsional spring apparatus, wherein said hitch ball assembly pivots with respect to said draw bar, whereby upon shocks and surges experienced between the trailer and the towing vehicle the hitch ball assembly moves against the force of the torsional spring apparatus in arc about the torsional spring apparatus, whereby said torsional spring apparatus dampens shocks and surges transmitted between said hitch ball assembly and said draw bar.

19. The apparatus has claimed in claim 18, wherein said torsional spring apparatus further includes:
   a housing having opposed first and second ends defining a hollow interior therebetween, said housing transversely mounted to said draw bar; and
   a plurality of rubber cords, said interior of said housing having said plurality of rubber cords inserted therein, wherein said rubber cords resist motion of said hitch ball assembly relative to said housing thereby dampening relative motion of said hitch ball assembly.

20. The apparatus as claimed in claim 19, wherein said hitch ball assembly further includes:
   a spindle having opposed ends extending through said housing, wherein movement by said spindle relative to said housing is resisted by said plurality of rubber cords;
   a pair of opposed sides arms coupled to said opposed ends of said spindle, each arm having an upper portion with a base portion extending therefrom, said pair of arms aligned generally parallel;
   a means for receiving a hitch ball, said hitch ball receiving means extending between said base portion of said pair of side arms and rigidly coupled thereto.

21. The apparatus as claimed in claim 20 further comprising:
   at least one overtravel stop rigidly affixed to said draw bar, said at least one overtravel stop configured to engage at least one side arm of said pair of opposed side arms when said opposed side arms pivot to a given position, thereby preventing said pair of side arms from pivoting beyond said given position.

22. The apparatus as claimed in claim 20, wherein said draw bar further includes opposed sidewalls having said topwall extending therebetween, and further comprising:
   a pair of opposed overtravel stops, said overtravel stops rigidly affixed to said opposed sidewalls of said draw bar, said overtravel stops configured to engage said pair of side arms when said side arms pivot to a given position thereby preventing said side arms from pivoting beyond said given positions.

23. The apparatus as claimed in claim 20, wherein said spindle has four sidewalls defining a square, and wherein said hollow interior has four interior wall defining a square.

24. The apparatus as claimed in claim 23, wherein said square spindle is rotated approximately 45° relative to said interior sidewalls when placed in operable non-loaded position thereby said square spindle sidewalls and said interior housing sidewalls define triangular regions, wherein said rubber cords are inserted into said triangular regions, and wherein at least one rubber cord of said plurality of rubber cords engages said spindle and at least one rubber cord engages at least one interior housing sidewall, whereby said plurality of cords support said square spindle and bias said square spindle toward a predetermined position.

25. The apparatus as claimed in claim 24, wherein said housing further includes an incremental scale, said scale having a plurality of increments, and wherein at least one of said pair of side arms includes an indicator in an operational relationship to said scale, whereby said indicator is aligned with said scale as an indication of the load applied to said hitch ball receiving means by a tongue of a trailer.

26. A trailer hitch assembly adapted to be removably coupled to a vehicle mounted receiver tube, said hitch assembly comprising;
   a draw bar having opposed first and second ends, a topwall, and opposed sidewalls, said opposed sidewalls having said topwall extending therebetween, said first end adapted to be closely received by a receiver tube and removably coupled thereto;
   a torsional spring housing rigidly affixed to said topwall of said draw bar, said torsional spring housing having interior walls and opposed ends, said interior walls defining a hollow interior, and said opposed ends having said hollow interior extending therebetween, wherein said opposed ends extend beyond said sidewalls of said draw bar, and wherein said hollow interior has a center axis extending between said opposed ends;
   a spindle having opposed ends inserted into said hollow interior of said housing extending therethrough;
   a plurality of rubber cords inserted into said hollow interior of said housing around said spindle, wherein said rubber cords press against said spindle and said interior walls of said housing such that said spindle is approximately co-axially aligned with said center axis of said interior of said housing;
   a pair of opposed reclined L-shaped side arms each having an upper portion and a base portion, each upper portion having said base portion extending generally horizontally therefrom and having an aperture formed therethrough, said apertures fitting closely around said opposed ends of said spindle;
   a means for rigidly fastening said pair of reclined L-shaped side arms to said opposed ends of said spindle, whereby said reclined L-shaped side arms and said spindle pivot as one;
   a spacer-bar assembly having opposed ends, said opposed ends abutting said base portions of said side arms, said spacer-bar assembly adapted to receive a hitch ball;
   whereby said spindle having said opposed reclined L-shaped side arms rigidly coupled thereto and said spacer-bar assembly abutting said base portions of said opposed reclined L-shaped side arms pivot as one rigid assembly.

27. The hitch assembly as claimed in claim 26 further including a means for stopping said side arms, whereby said side arms are prevented from pivoting backward toward said draw bar beyond a given point.

28. The trailer hitch assembly as claimed in claim 27, wherein said stopping means includes a pair of aligned overtravel stops rigidly affixed to said opposed walls of said draw bar.

29. The trailer hitch assembly as claimed in claim 26, wherein said interior walls of said torsional spring housing defines a square, and wherein said spindle has four sidewalls defining a square.

30. The trailer hitch assembly as claimed in claim 29, wherein said spindle is rotated 45° relative to said interior walls thereby said spindle walls and said interior housing walls define triangular regions, and wherein said rubber cords are inserted into said triangular region, whereby at least one of said rubber cords engages said spindle and at least one of said rubber cords engages at least one of said interior housing walls.

31. The hitch assembly as claimed in claim 30, wherein said opposed ends of said torsional spring housing define a torsional spring housing transverse length, wherein said opposed side arms are aligned generally parallel, wherein said opposed ends of said spacer-bar assembly define a spacer-bar assembly transverse length, wherein said spacer-bar assembly has a transverse length greater than said torsional spring housing transverse length, whereby said opposed side arms abutting said opposed ends of said spacer-bar assembly and extending generally parallel therefrom are separated from said opposed ends of said torsional spring housing thereby said side arms pivot about said torsional spring housing without binding on said torsional spring housing.

32. The hitch assembly as claimed in claim 26, wherein said torsional spring housing further includes a top exterior wall having an incremental scale thereon, said incremental scale having a plurality of increments, wherein at least one side arm has an indicator in an operational relationship to said scale, whereby said indicator is aligned with said scale as an indication of the load applied to said spacebar by a tongue of a trailer.

33. A trailer hitch, said hitch including a rigid draw bar configured for rigid connection to a towing vehicle and a hitch ball assembly, the improvement comprising:

a torsional spring apparatus pivotally connecting about a pivot point said hitch ball assembly to said rigid draw bar, wherein said torsional spring apparatus surrounds said pivot point and resiliently maintains said hitch ball assembly displaced vertically and horizontally from said torsional spring, whereby upon shocks and surges experienced between the hitch ball assembly and the towing vehicle the hitch ball assembly moves against the force of the torsional spring apparatus in arc about the torsional spring apparatus, whereby said torsional spring apparatus dampens shocks and surges transmitted between the hitch ball assembly and the rigid assembly.

34. The trailer hitch of claim 33 further including means for weighing the tongue weight of a trailer hitched to said hitch ball assembly.

35. The trailer hitch of claim 34, wherein said weighing means includes an indicator and an incremental scale, said incremental scale having a plurality of increments, said hitch ball assembly having said indicator thereon, said rigid assembly having said incremental scale thereon in operational relationship to said indicator, whereby the weight of a tongue of a trailer is indicated by the amount of pivoting of said hitch ball assembly with respect to said rigid assembly.

36. The trailer hitch of claim 33, wherein said torsional spring includes at least one rubber cord, whereby said at least one rubber cord resists pivoting of said hitch ball assembly with respect to said rigid assembly.

37. The trailer hitch of claim 33, wherein said rigid assembly further includes means for stopping said hitch ball assembly from pivoting backward beyond a given point.

38. The trailer hitch of claim 33, wherein said hitch ball assembly includes a pair of opposed load bearing side arms having first and second ends, each first end removably coupled to said torsional spring apparatus, said pair of second ends having a hitch ball disposed therebetween, said rigid assembly includes a tow bar having opposed side walls and a top wall extending therebetween, each side wall having an overtravel stop rigidly affixed thereto, said overtravel stops configured to engage said pair of said arms proximal to said first end when said side arms pivot to a predetermined position thereby preventing said side arms from pivoting beyond the predetermined position.

* * * * *